(12) United States Patent
Shani

(10) Patent No.: US 7,225,037 B2
(45) Date of Patent: May 29, 2007

(54) SYSTEM AND METHOD FOR IMPLEMENTING LOGIC CONTROL IN PROGRAMMABLE CONTROLLERS IN DISTRIBUTED CONTROL SYSTEMS

(75) Inventor: Haim Shani, Shoham (IL)

(73) Assignee: Unitronics (1989) (R"G) Ltd., Airport, Ben Gurion Airport (IL)

( * ) Notice: Subject to any disclaimer, the term of this patent is extended or adjusted under 35 U.S.C. 154(b) by 236 days.

(21) Appl. No.: 10/932,889

(22) Filed: Sep. 2, 2004

(65) Prior Publication Data
US 2005/0085928 A1     Apr. 21, 2005

Related U.S. Application Data

(60) Provisional application No. 60/499,972, filed on Sep. 3, 2003.

(51) Int. Cl.
*G05B 19/42* (2006.01)
*G06F 9/45* (2006.01)

(52) U.S. Cl. .................. 700/18; 700/86; 717/136; 717/137

(58) Field of Classification Search .................. 700/18, 700/86, 87, 65; 717/136–140; 709/217, 709/218, 225, 205
See application file for complete search history.

(56) References Cited

U.S. PATENT DOCUMENTS

| | | |
|---|---|---|
| 4,616,312 A | 10/1986 | Uebel |
| 4,627,055 A | 12/1986 | Mori et al. |
| 4,937,777 A | 6/1990 | Flood et al. |
| 5,239,641 A | 8/1993 | Horst |
| 5,297,257 A | 3/1994 | Struger et al. |
| 5,530,643 A | 6/1996 | Hodorowski |
| 5,805,442 A | 9/1998 | Crater et al. |
| 5,845,149 A | 12/1998 | Husted et al. |
| 5,896,289 A | 4/1999 | Struger |
| 5,949,674 A | 9/1999 | Song et al. |
| 6,028,857 A | 2/2000 | Poor |
| 6,061,603 A | 5/2000 | Papadopoulos et al. |
| 6,154,680 A | 11/2000 | White et al. |

(Continued)

FOREIGN PATENT DOCUMENTS

EP          1 076 275 A2     2/2001

(Continued)

OTHER PUBLICATIONS

"RF wireless remote controls for PLC, SCADA—FM transmitters, receivers," http://www.oksolar.com/communications/remote_control/.

(Continued)

*Primary Examiner*—Thomas K. Pham
(74) *Attorney, Agent, or Firm*—Smith, Gambrell & Russell LLP

(57) ABSTRACT

The present invention provides a system and method for implementing logic control in programmable controllers in distributed control systems using a wired or wireless network. A software application is used to define the configuration of the network. Based on the network configuration, a compiler engine automatically assigns each statement of the control program to at least one programmable logic controller in the network. Each statement is then transmitted over a data transmission medium to the programmable logic controller assigned to the statement.

36 Claims, 7 Drawing Sheets

U.S. PATENT DOCUMENTS

| | | | |
|---|---|---|---|
| 6,167,319 A * | 12/2000 | Harris et al. | 700/86 |
| 6,263,487 B1 | 7/2001 | Stripf et al. | |
| 6,282,454 B1 | 8/2001 | Papadopoulos et al. | |
| 6,437,692 B1 * | 8/2002 | Petite et al. | 340/540 |
| 6,484,061 B2 | 11/2002 | Papadopoulos et al. | |
| 6,487,455 B1 * | 11/2002 | Balasubramanian | 700/2 |
| 6,501,996 B1 | 12/2002 | Bieber | |
| 6,510,352 B1 * | 1/2003 | Badavas et al. | 700/19 |
| 6,640,140 B1 | 10/2003 | Lindner et al. | |
| 6,659,947 B1 | 12/2003 | Carter et al. | |
| 6,732,191 B1 | 5/2004 | Baker et al. | |
| 6,738,967 B1 | 5/2004 | Radigan | |
| 6,754,846 B2 | 6/2004 | Rasmussen et al. | |
| 6,760,782 B1 | 7/2004 | Swales | |
| 2003/0061274 A1 * | 3/2003 | Lo | 709/203 |
| 2003/0061311 A1 * | 3/2003 | Lo | 709/220 |
| 2003/0061349 A1 * | 3/2003 | Lo et al. | 709/225 |
| 2005/0108693 A1 * | 5/2005 | Lo | 717/140 |
| 2005/0132064 A1 * | 6/2005 | Lo | 709/227 |
| 2005/0144600 A1 * | 6/2005 | Lo | 717/140 |
| 2005/0144601 A1 * | 6/2005 | Lo | 717/140 |

FOREIGN PATENT DOCUMENTS

| | | |
|---|---|---|
| WO | WO 01/35190 A2 | 5/2001 |

OTHER PUBLICATIONS

"Wireless Automation," http://www.klinkmann.com/eng/automation/wireless/wirelessconcept/.

Mintchell, Gary, "Control System Skills," utomation World, http://www.automationworld.com/articles/Features/74.html, 2003, Summit Media, LLC.

"The ALSTOM e-Control Architecture," Jul. 2003, EPFL-Industrial Automation, Hong Kong.

"Replacing Replays," http://www/plcs.net.chapters/replace8.htm, 2004, Phil Melore.

"Introduction to PLC Programming," http://omarz.htmlplanet.com/intro_Programming.htm.

Frost & Sullivan, "World Programmable Logic Controllers Market: 7450-10," 2001, #7450-10, www.frost.com.Frost & Sullivan, San Jose, CA.

* cited by examiner

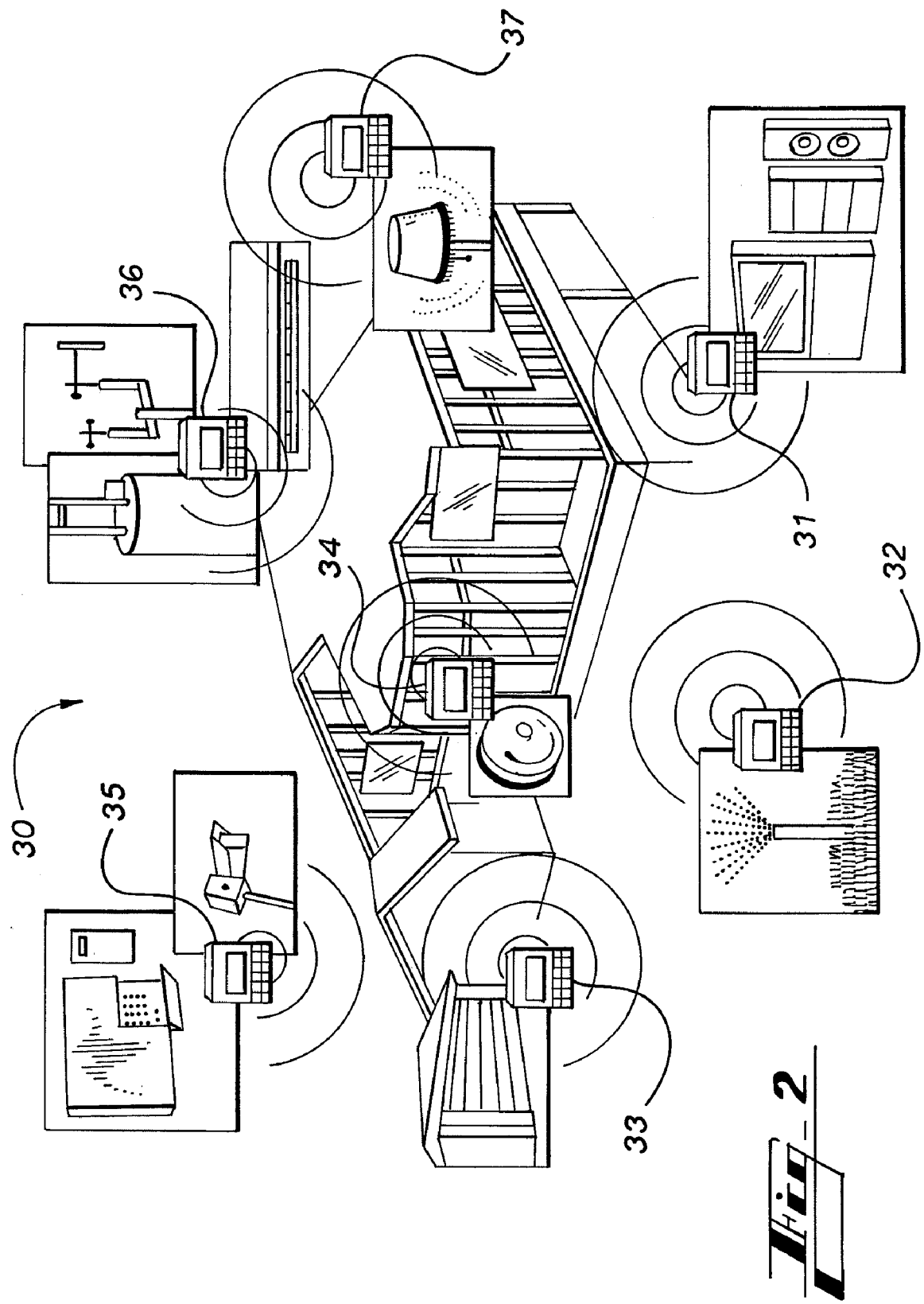
FIG_2

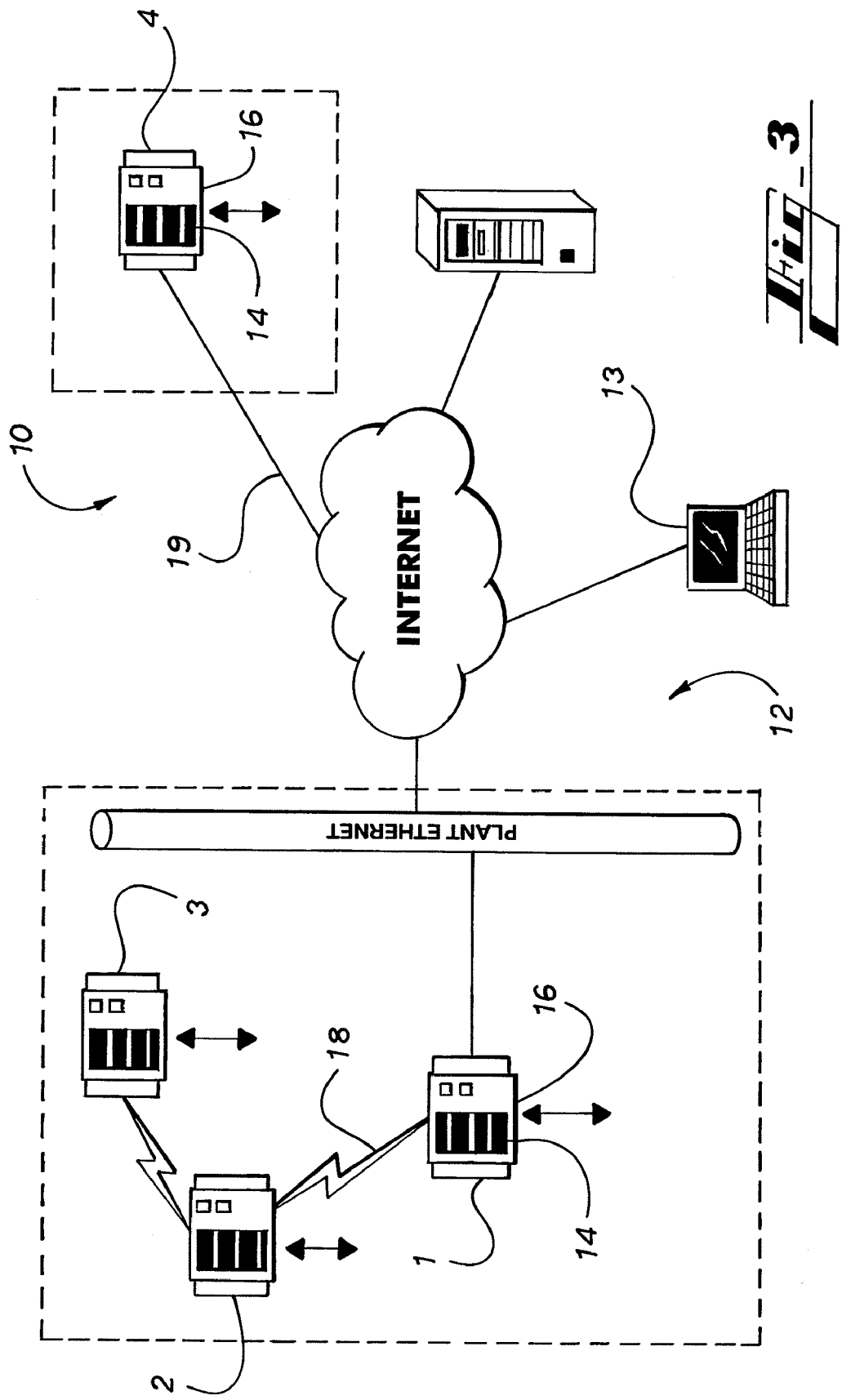

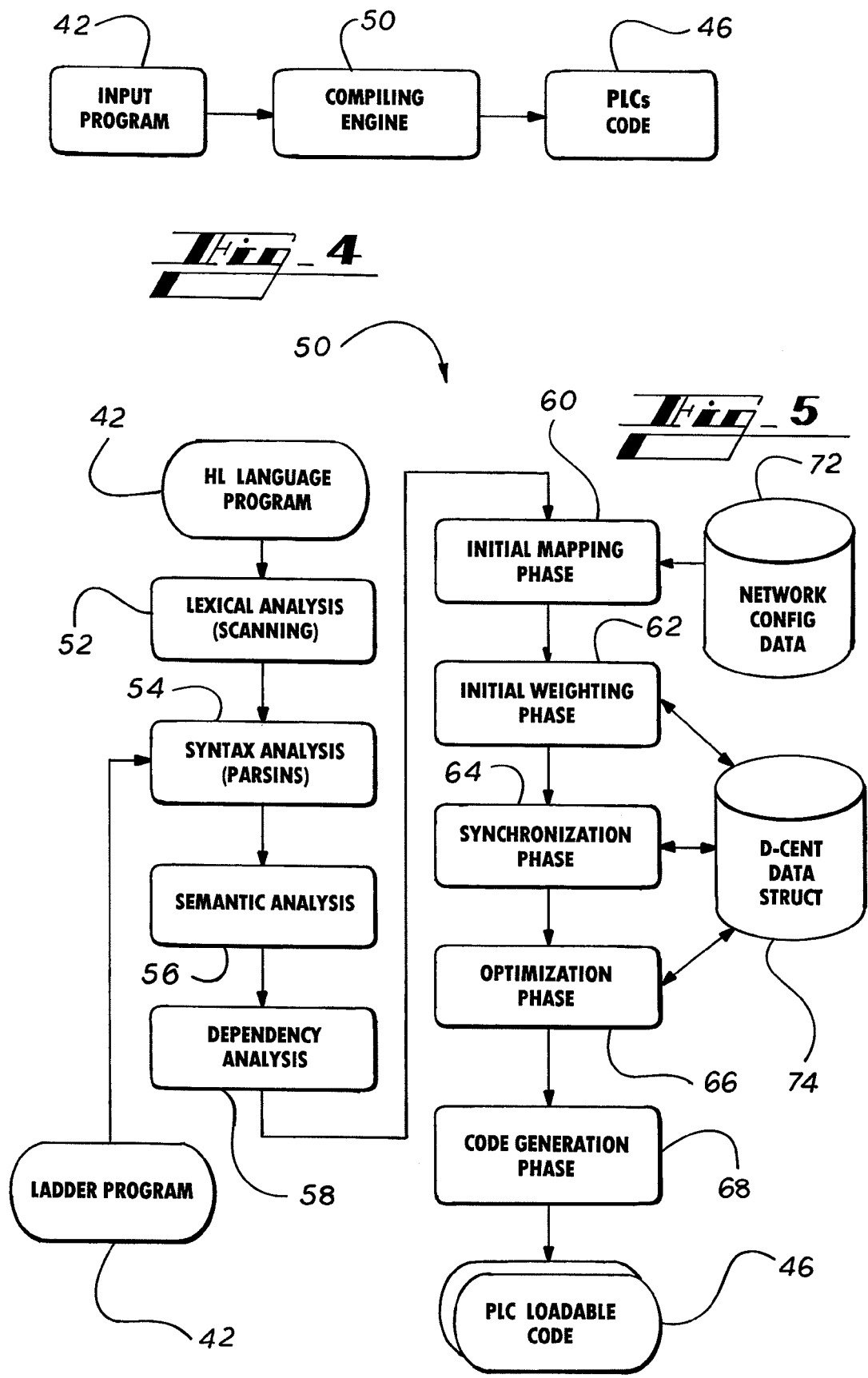

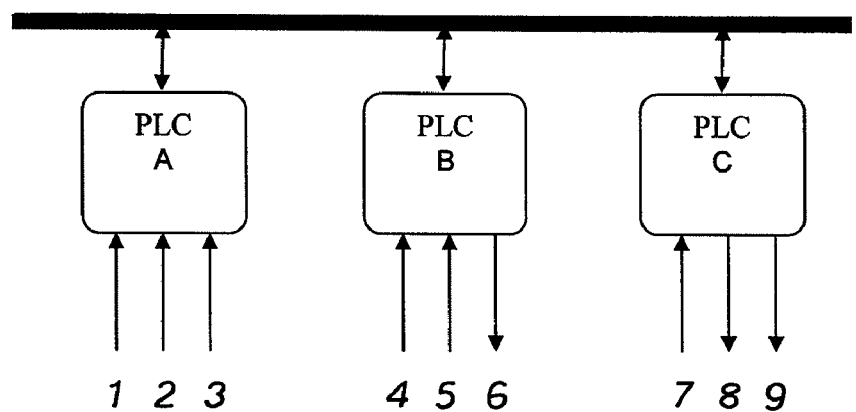
Fig_6
| PLC | Criteria | Value | Weighted Score |
|---|---|---|---|
| 1 | Inputs Timing Constraints | | |
| | Outputs Timing Constraints | | |
| | CPU Usage | | |
| | Memory Usage | | |
| | Communication | | |
| | | | |
| | | | |
| | Total Score | | |
| PLC | Criteria | Value | Weighted Score |
|---|---|---|---|
| N | Inputs Timing Constraints | | |
| | Outputs Timing Constraints | | |
| | CPU Usage | | |
| | Memory Usage | | |
| | Communication | | |
| | | | |
| | | | |
| | Total Score | | |
X Statement 1......N
Fig_7

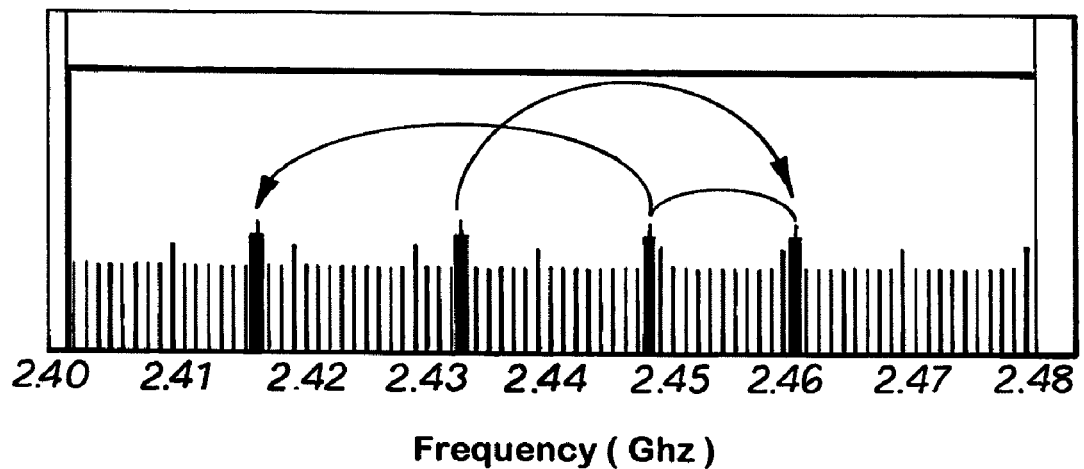
Fig_8
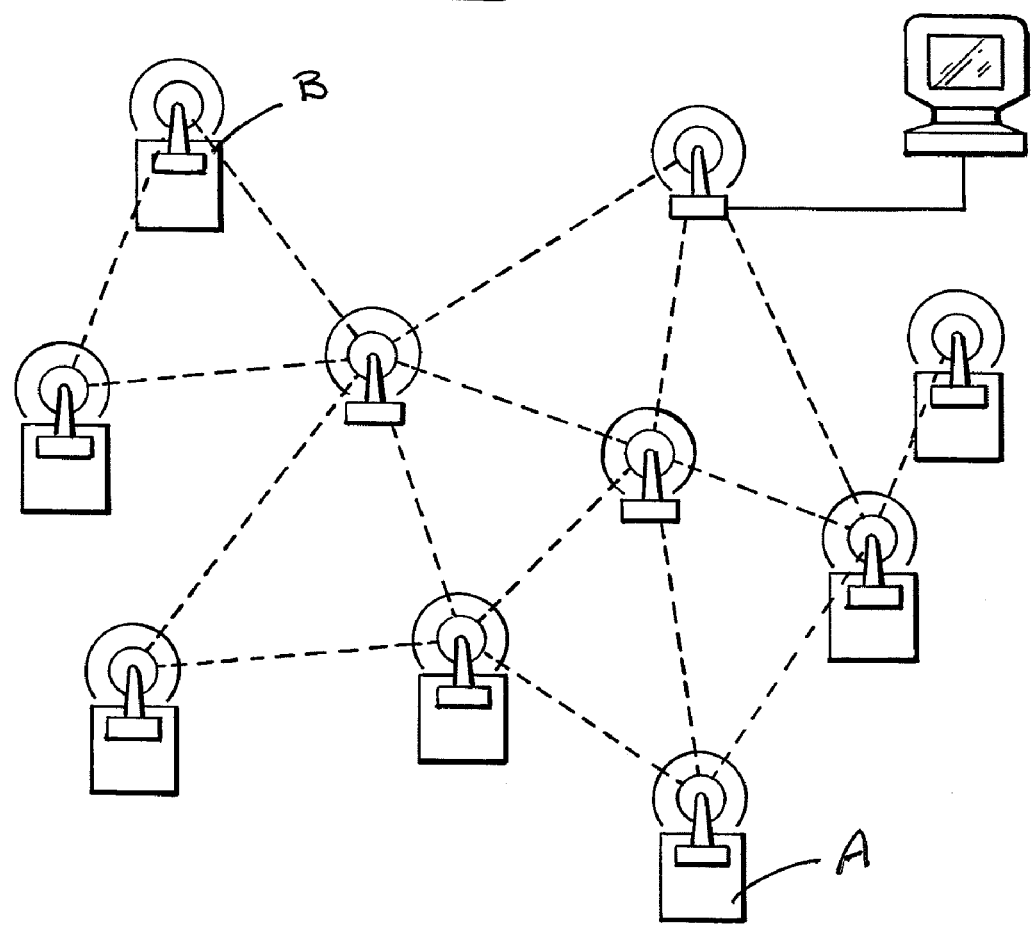
Fig_9

SYSTEM AND METHOD FOR IMPLEMENTING LOGIC CONTROL IN PROGRAMMABLE CONTROLLERS IN DISTRIBUTED CONTROL SYSTEMS

RELATED APPLICATION

This application claims the benefit of priority of U.S. provisional application Ser. No. 60/499,972, filed Sep. 3, 2003, which is relied on and incorporated herein by reference.

FIELD OF THE INVENTION

The present invention relates generally to industrial control and automation systems. More specifically, the present invention relates to a system and method for implementing logic control in programmable controllers in distributed control systems using a wired and/or wireless network.

BACKGROUND OF THE INVENTION

Distributed Control Systems.

The concept of distributed industrial control systems, which have both a hardware and software component, is known in the art. Distributed control has been used since companies began installing programmable logic controllers ("PLCs") to manage independent parts of a factory floor. PLCs are used in industrial control systems to provide coordinated control of equipment, devices, and processes. PLCs generally comprise a central processing unit ("CPU") and a plurality of input/output ("I/O") modules having I/O connection terminals. PLCs are ordinarily connected to various sensors, switches, or measurement devices that provide inputs to the PLC and to relays or other forms of output to control the field equipment or other controlled elements.

As control technology evolved, the idea of islands of programmable controllers was discarded in favor of larger, centralized controllers. Industry is now moving back to a decentralized approach in which small, intelligent controllers gather data locally and share it across a network.

The move back to a decentralized approach may be explained by describing the disadvantages of using a centralized control system. First, a centralized control system has lower flexibility and scalability. The maximum number of I/O modules and therefore I/O connections that can be controlled is determined during design by the model of controller used. Second, because a single processor (CPU) and a given amount of memory are used for the entire system, any future additional device, or any change in the system's configuration, must consider these limitations. Alternatively, an oversized central controller must be chosen in advance. Third, the wiring requirements for a centralized system, wherein every device must be wired to a central controller, are extensive. Although the use of remote I/O modules can reduce wiring requirements, adding more I/O modules to an existing controller does not add processing power and memory, which are usually fixed.

With reference to FIG. 1, a conventional modern home automation system 20 allows the homeowner to electronically control lighting, air-conditioning and other energy consumption devices, security and alarm systems, home theater systems, irrigation and water systems, hot water supply systems, and other controllable systems. Conventionally, a dedicated device, e.g., a controller 21–27, is used to control each sub-application independently (a distributed approach). However, for a homeowner to make the most out of the overall system, he or she must combine certain conditions and link all the different sub-applications together.

For example, when the rain detector connected to the irrigation controller 22 detects rain, the system 20 should (1) instruct the irrigation controller 22 to skip the irrigation plan for the day and (2) instruct the air condition and climate controller 26 to turn on heating in the baby's room. Similarly, when the alarm system connected to the security controller 25 detects an intrusion, the system 10 should (1) instruct the security controller 25 to sound an alarm signal and dial "911," (2) instruct the lighting controller 27 to turn on lights in the house in a sequence simulating a person walking, and (3) instruct the irrigation controller 22 to turn on the irrigation sprinklers around the house. Or, when no motion is detected for more than 15 minutes in a room by the motion detectors connected to the security controller 25, the system 20 should (1) instruct the home theater controller 21 to turn off working audio systems in that room, (2) instruct the lighting controller 27 to turn off lights in that room after 30 minutes unless instructed otherwise, and (3) instruct the air condition and climate controller 26 to turn off air condition in that room after 60 minutes unless instructed otherwise.

In order to perform these tasks in a typical distributed system, each controller 21–27 must be programmed independently. The linking conditions must be programmed in each controller that triggers a condition and in each controller that should react to the triggered condition. Further, a wiring or networking infrastructure 28 linking the controllers 21–27 must be provided.

Alternatively, a centralized system could be used wherein a single controller controls all the devices in the system. This would allow every condition to be set in one control program, but the wiring requirements in such a system would be much more extensive, and, importantly, the system would suffer from the lack of flexibility and scalability. Were an existing device to need functional expansion, or were any additional device to need control in the future, it would require additional I/O modules to be added to the controller (if technically possible) and would require additional control programming as well, which would increase the workload for the fixed central processor and memory.

For these and other reasons, today's automation world is moving towards distribution of control rather than building centralized systems. In addition, the industry is making use of small (including "micro" and "nano") PLCs and exploiting the latest improvements in communications and network technologies which have allowed companies to migrate from a centralized structure to a true distributed architecture. Such improvements include embedded networking capabilities (especially Ethernet, TCP/IP based solutions), new powerful CPUs that make controllers faster and stronger, enhanced security features for decentralized architectures, the physical downsizing of controllers, and reduced pricing.

Further, today's world automation market is seeing several major trends. First, the demand for programmable logic controllers (PLCs) is growing as end users need more automation and are not able to afford machine downtime. Second, users are taking advantage of commercial networks to connect PLCs in their systems. Third, the future lies in distributed networking of powerful, low cost PLCs.

As described above, some of the factors driving decentralized control include reduced wiring, better reliability, aggregated computing power, scalability, and modularity (right sized solutions). Nonetheless, while the drive towards distributed networking and decentralized control has important advantages, it also has significant drawbacks. Particularly, each controller in a decentralized system typically must be programmed independently (creating islands of control code). Moreover, system designers and programmers must handle the communications, signal sharing, interlocking, and other data transfer requirements between the controllers. Maintenance is more complicated because global changes must be repeated in each component and because a single change requires modifications in more than one controller. Further, although a decentralized control system is scalable, modular, and benefits from aggregated computing power, the workload between the processors typically is not balanced and depends on the way the designer chooses to distribute the code among the various processors.

Thus, the trend toward decentralized control opens new opportunities and creates important challenges. Therefore, a need exists for a system and method that uses the advantages of a distributed control environment, without loosing the power of a centralized system in designing, right-sizing, programming, running, and synchronizing an application.

Wireless Communication.

Another cross industry trend is the use of wireless communication. Wireless technology is used (1) by retailers for mobile shopping, personal shopper applications, merchandising, delivering retail content to wireless devices, and in-store employee applications; (2) by the healthcare industry for physician practice management, pharmaceutical sales force automation, e-clinical trials, and hospital information systems; (3) by the financial services industry for on-line financial services, wealth management, customer loyalty tracking, and insurance claims; (4) by the utilities industry for providing field workers access to information (schematics, alerts), providing customers with account access, providing access to supply chain information from anywhere, and providing machine-to-machine communication; and (5) by the travel and transportation industry for flight confirmations, rapid check-in, airline/airport operations, route track and trace, and rail car management.

Looking carefully into wireless machine-to-machine communication applications reveals notable growth in recent years. For instance, there has been an emergence of (1) after sale services, such as when a commercial supplier of industrial heating and cooling systems remotely monitors usage rates and tracks warranty data; (2) extended operations capabilities, such as where the wireless transmission of production data eliminates the requirement for timely manual data collection across remote areas and reduces the opportunity for error in data entry; (3) cashless payment methods, such as where radio frequency identification ("RFID") transponders facilitate toll collection and monitor highway usage patterns; and (4) secure identification capabilities, such as using "Smart Cards" and embedded "Smart Chips" for access control and the storage of personal records.

With respect to today's world automation market, there are several major trends relating to wireless communication. For example, technological improvements have led to using PLCs as transmitters for remotely communicating with field instrumentation. In addition, the use of peer-to-peer communications and wireless technology has increased as control is distributed to field devices. Specifically, the introduction of Ethernet radio modems is a growing trend in the PLC industry for providing flexibility to system design and reliable wireless communication between PLCs and between a PLC and a PC.

The requirements of the PLC world for reliable communication links results mainly from the need to share data, transfer signals, communicate with sensors, and communicate with host computers (either for remote control or for programming purposes). In a distributed environment, the communication link is a key component for the entire system.

Existing solutions are based mainly on wired communication standards accepted by the industry, ranging from simple 2-wire or 4-wire physical infrastructures such as RS-232 or RS-485, using protocols such as ModBus or others, to Ethernet physical infrastructures using TCP/IP, or other protocols based on TCP/IP. These wired solutions are used both in the field bus level (connecting PLCs to field instrumentation, inputs, and outputs) and in higher levels such as connecting PLCs to each other or to host systems.

The need to reduce or even eliminate expensive wiring requirements, while increasing flexibility and mobility, resulted in several existing wireless solutions, all using external or independent Radio Frequency ("RF") modems as wireless communication adapters. These include, (1) license-free radio modems using ISM (industrial, medical, and scientific) frequency bands such as 433 Mhz, 900 Mhz, 2.4 Ghz, or 5.7 Ghz, which can be used in certain countries without a special license; (2) licensed radio modems, which are usually more powerful devices, are required for longer ranges, and use frequency bands that usually need operating licenses from local authorities; (3) wireless LAN modems, which are a more recent trend, use standards such as IEE802.11 (b, g) developed to provide wireless connectivity especially for mobile computing (notebooks, PDAs, etc.), and usually require one or more central access points to be present; and (4) cellular modems that use the cellular telephony infrastructure (usually nationwide) for data purposes. Cellular modems exist for all type of networks (GSM, GPRS, CDMA, TDMA, iDEN, etc.).

The primary drawbacks of these existing solutions are (1) the need to develop support for the wireless modem (rarely a standard feature in PLCs); (2) the need for radio operation licensing in certain cases (especially for long range operations); (3) the relatively high cost of the devices (required for every PLC that needs to communicated wirelessly); and (4) the high operating costs that are required when using a public wireless network (such as a cellular network), whether such costs are fixed or based on traffic.

With reference again to FIG. 1, in the home automation system 10 described above, a wiring infrastructure 28 is required to connect the controllers 21–27 to the "world" being controlled (inputs such as sensors and outputs such as relays controlling valves, lights, air-condition motors, etc.), as well as to connect the controllers 21–27 to each other in order to allow data and signal interchange or remote programming. Therefore, extensive, and expensive, network wiring is required. Further, any modification or expansion to the system 10 (e.g., when adding a new controller for a new application) requires an addition of network infrastructure 28.

Accordingly, a need exists for a system that eliminates the burden of such cabling requirements.

Internet-Based Communication Platforms.

Instant messaging services, such as those provided by AOL, ICQ, Microsoft, and Yahoo, provide a communication platform using a client program installed on each user's computer, based on prior registration to the service. The client program automatically notifies the service provider's server every time a user (the client program) is connected to the Internet. The server maintains a list of users currently online, their current Internet (IP) addresses, and their user profiles, and serves as a coordinator between users whenever a user initiates a communication with another listed user.

The actual communication is conducted directly between the users after getting all of the required information from the coordinating server. The communication can be a "chat" program, a "messaging" (email-like) program, a file transfer program, a video conferencing application, a shared game, or other application. Such "instant messaging" functionality would be useful in automation systems.

Therefore, a need exists for an automation and control system that provides "instant messaging" functionality between control elements.

SUMMARY OF THE INVENTION

The present invention answers these needs (1) by providing a unique control system and method for implementing a control program into a distributed control environment, without losing the advantages of a centralized system that relate to designing, right-sizing, programming, running, and synchronizing the application; (2) by replacing burdensome cabling with a reliable integrated wireless link, making both installation and future modifications easier; and (3) by providing an Internet-based communication platform.

Distributed/Centralized Control System.

The present invention provides a unique control system comprising a centralized control system where every I/O module has processing power and memory for performing logic and processing operations. The control system also can be seen as a distributed control system that is a network of independent PLCs interconnected by means of a wired or wireless transmission media. In the control system of the present invention, users develop a single control program that is seamlessly transformed into a distributed program based on the actual configuration of the network. In particular, the user designs one "centralized system" and writes one control program for the entire system, but the actual configuration of the network consists of several "independent" PLCs.

Wireless Controllers.

In another embodiment of the present invention, wireless controllers are provided that comprise PLCs with embedded short range radio communication capabilities. The wireless controllers are connected in a mesh network and have self-organizing capabilities. The individual PLCs within the network reliably communicate with each other using a wireless transmission medium. Individual PLCs may also serve as a gateway for communication with a PLC at a remote site or with an Internet user.

Web Access Control Platform.

In still other embodiments, the present invention also comprises an Internet-based instant messaging platform which allows easy development of control applications with Internet communication, without prior knowledge of communication programming. Thus, I/O modules connected to the Internet may communicate with each other and/or with a central control system through a coordinating server that provides this service. The server is provided either as a product for large customers, or as a service for smaller customers.

Accordingly, if the present invention were employed in a home automation suite, it would treat the system as a whole even though independent controllers are controlling each sub-application. The homeowner could seamlessly create any condition tying any input to any output. This promises a new range of applications and an ease of implementation unknown in the art. Any expansion of the system adds a complete set of I/O connectivity with additional processing power and memory.

Moreover, the use of wireless controllers eliminates the burdensome cabling requirements by replacing cabling with a reliable wireless link, making both installation and future modifications easier. Further, the use of the Internet-based instant messaging platform allows simple implementation of dynamic applications requiring connection to and through the "external world."

It is thus an object of the present invention to provide a system and method which allows for simple and easy implementation of either small control programs based on a single controller or large distributed programs based on tens or even hundreds of distributed controllers.

Another object of the present invention is to provide an industrial control system wherein every I/O module has processing power and memory, and is capable of performing logic and processing operations.

A further object of the present invention is to provide a system and method wherein the development of the control program, in either small or large systems, can be made without concern for the physical configuration of the network or the means of communication within the network.

A still further object of the present invention is to provide a system comprising wireless controllers to eliminate expensive wiring and enhance modularity and reconfiguration ability.

Another object of the present invention is to provide a simple, Internet-based, easy-to-use and easy-to-implement communication mechanism for use between PLCs, that includes instant messaging, file transfer, program upload and download, and remote access.

Further objects, features and advantages will become apparent upon consideration of the following detailed description of the invention when taken in conjunction with the drawings and the appended claims.

BRIEF DESCRIPTION OF THE DRAWINGS

FIG. 2 is a relational diagram showing a wireless home (non-industrial) automation control system in accordance with the present invention.

FIG. 3 is a relational diagram showing a control system in accordance with the present invention.

FIG. 4 is a high-level flow diagram of a control program implementation method in accordance with the present invention.

FIG. 5 is a flow diagram of the main part of a control program implementation method in accordance with the present invention.

FIG. 6 is a relational diagram showing programmable logic controllers in a network configuration in accordance with the present invention.

FIG. 7 is a table showing a control statement weighting matrix in accordance with the present invention.

FIG. 8 is a spread spectrum diagram showing a frequency hopping technique in accordance with the present invention.

FIG. 9 is a relational diagram of a mesh network of wireless controllers in accordance with the present invention.

DETAILED DESCRIPTION OF THE INVENTION

Figure 1:
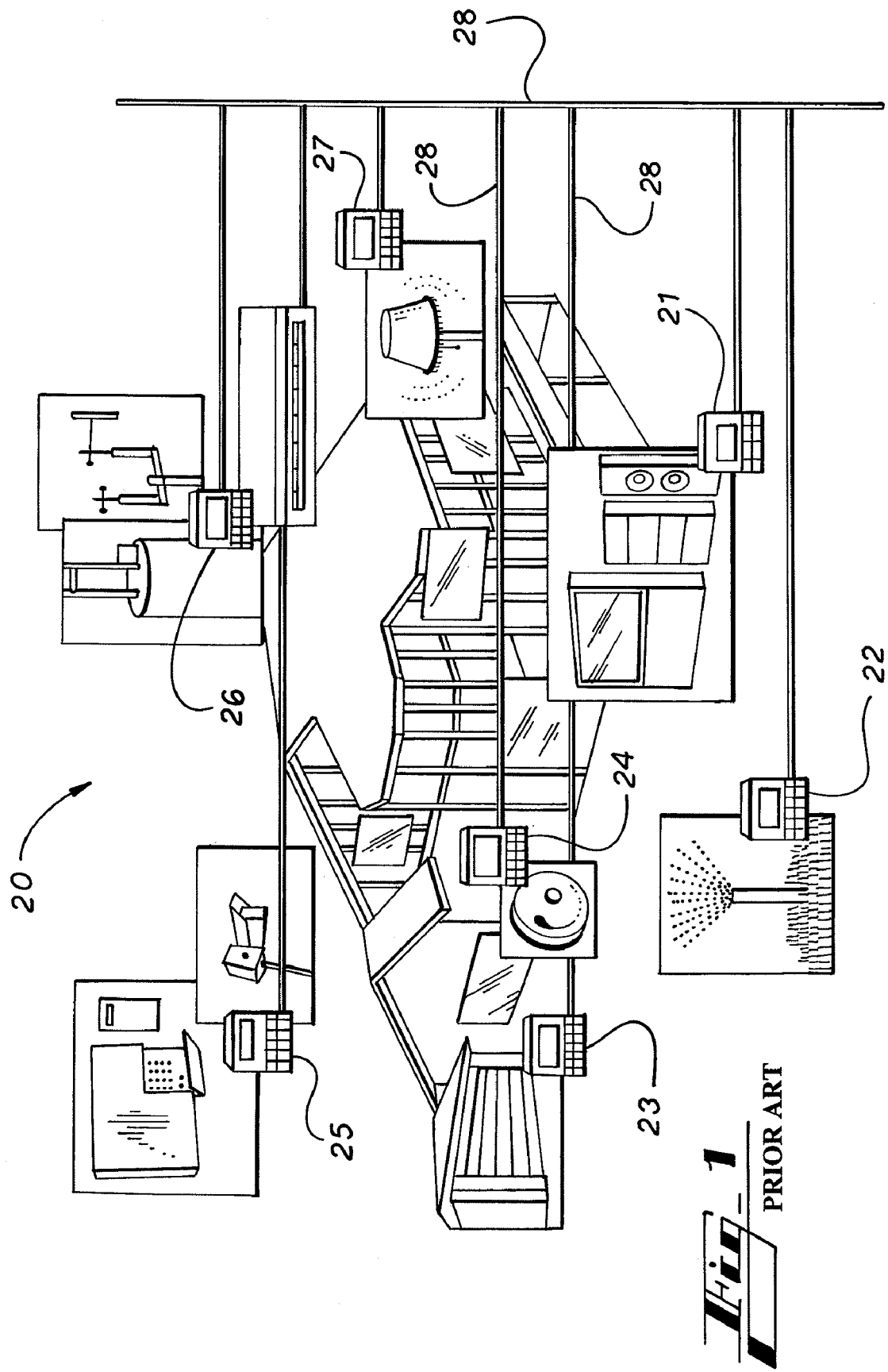
FIG. 1 is a relational diagram showing a home (non-industrial) automation control system in which the present invention may find application.

The present invention provides a system and a method for implementing a control program into a distributed control system, without losing the advantages of a centralized system in designing, right-sizing, programming, running, and synchronizing an application. The present invention also provides a reliable wireless link between the PLCs of a control system, thus eliminating the need for expensive communication wiring. In addition, the present invention provides an Internet-based communication platform for use in a control system.

Distributed/Centralized Control System.

Referring to FIG. 3, a control system 10 in accordance with the present invention is a centralized control system, where every I/O module 14 is like a small PLC and has its own processing and logic capability. In addition, the control system 10 may be seen as a distributed control system, i.e., a network 12 of practically independent PLCs 1–4 interconnected on a transmission medium 18, be it wired or wireless.

In the control system 10, any future expansion of the system 10 adds a complete set of I/O connectivity with additional processing power and required memory allowing true right-sizing. PLCs 1–4 of the control system 10 are not programmed independently. As in a centralized system, a single programming environment is used to plan, design, and write the control program for the system 10 as a whole, detached from the physical layout and configuration of the network 12. A software application ("the configurator/editor") and a compiler engine 50 (FIGS. 4 and 5) reside on a host computer 13 that acts as a central processor for programming and design. The compiling engine 50 (FIGS. 4 and 5) of the control system 10 takes care of transforming the control program into independent and specific code portions running in each PLC 1–4. The network 12 becomes then, the PLC 1–4.

The control system 10 maintains the advantages of a centralized control architecture, such as the ability to plan and design the system 10 as a whole and the ability to write one control program for the entire system 10 rather than writing islands of control code, thus resulting in easier development and maintenance. Moreover, certain advantages of a distributed control architecture are kept as well, such as modularity, scalability, reduced wiring requirements, and aggregated computer power.

Each PLC 1–4 of the present invention has its own central processing unit ("CPU"), memory (for programs, data structures, and variables), and I/O modules 14. The PLCs 1–4 receive and send I/O signals that may be digital or analog. The I/O signals are used to connect the PLC 1–4 to the controlled target. In one embodiment, the PLCs 1–4 have four to eight (4 to 8) built-in I/O modules 14 while in other embodiments, the PLCs 1–4 may have ten (10) or more built-in I/O modules 14. In still other embodiments, the PLCs 1–4 are expandable to hundreds of I/O modules 14 with the aid of, for example, expansion units or external remote I/O modules.

In accordance with the present invention, the I/O modules 14 of the PLCs 1–4 are equipped with I/O connections 16 enabling the direct connection of devices, bar code readers, scales, frequency converters, precision positioning encoders and other complex devices for immediate, uninterrupted access.

In the described embodiment, the PLCs 1–4 have built-in networking capabilities in order to communicate with each other and to allow distributed control. In one embodiment, the present invention comprises PLCs 1–4 with built-in support for communication over a wireless transmission medium 18, i.e., the signals are carried by electromagnetic waves rather than by physical wiring. The wireless network 12 can be used for enabling system control. In another embodiment, the network 12 of the present invention comprises a common wire-based transmission media 19 such as direct connection, flat cable, plug-in type rack-connection, plug-in type motherboard-connection, fiber-optic cable, twisted-wire pair, or coaxial cable. This embodiment may use known networking technology such as Ethernet and known communication protocols such as TCP/IP to allow the PLCs to easily communicate with higher-level applications running on host computers. It will be appreciated that the present invention may use other accepted networking protocols such as DeviceNet, CanBus, or Can derivatives.

Single Programming Environment.

PLC programming today mirrors the world's software development trends, making programming tasks simpler and less time-consuming. Advanced single programming environments allow easy development, configuration management, work group exchange facilities, and more. The PLC programming environment of the present invention follows these trends, based on the International Electro-technical Commission IEC-1131 standard, which certifies languages for programming PLCs. The PLC programming environment supports common needs such as multi-user and multi-project uses, and is able to couple with large systems being designed and programmed. The present invention includes a software application ("the configurator/editor") which is used to create control projects for the PLCs.

In the described embodiment, the control program is planned as a whole, as if the user were designing a centralized system. After planning the control tasks, the designer uses the software application to write the control program in source code using a high-level programming language, such as structured text, Basic, C, C++, or Java, a lower-level programming language such as Relay Ladder Logic, State Logic, Instruction List, Ladder Diagram, Function Block Diagram, Continuous Function Chart, or Sequential Function Chart, or any other acceptable PLC programming language. The software application may also be used to write the human machine interface ("HMI") program which controls the PLC's operating panel display and functionality. In writing the control program, all of the I/O connections 16 within the network 12 are defined using symbolic names, without regard to the physical layout of the network 12 or to the actual location of the I/O connections 16.

For example, with reference to FIG. 6, in writing the control program, suppose StartOfLineSensor represents a photo cell physically connected to I/O connection 2 of PLC A; EndOfLineSensor represents a photo cell physically connected to I/O connection 4 of PLC B; and StopMotor represents a relay physically connected to I/O connection 7 of PLC C. In accordance with the present invention, the programmer uses only these symbolic names without knowing at this stage how they are connected in the network 12. In an illustrative high-level programming language:

IF EndOfLineSensor
AND NOT StartOfLineSensor
THEN StopMotor

In order to comply with modem programming techniques and the need to code large control programs, the use of functions and subroutines allows selective repetitions of code execution, along with other unique techniques required in a distributed control system, such as symbolic indexed I/O connections (e.g., PhotoSensor[i], where i is resolved either during compilation or, when possible, during runtime).

With reference again to FIG. 3, the control system 10 of the present invention allows the system designer or programmer to specifically assign a statement of the control program to run on a specific PLC 1–4 within the network 12. As described further below, the compiling engine 50 (FIGS. 4 and 5) is able to automatically assign each statement to a PLC 1–4 in an optimized manner. However, in certain cases, the designer may desire to control this function for performance or other reasons.

Network Configuration.

In the control system 10, there is a need at a certain stage to tie the logical and physical worlds to one working system. The software application ("the configurator/editor") is used to define the configuration of the PLCs 1–4 and the I/O connections 16 in the network 12. In one embodiment, the software application comprises a graphical user interface ("GUI") for graphically defining the network 12 and its components. In another embodiment, the user defines the network 12 configuration using a simplified table, such as that shown in Table 1 below, which defines the configuration of the network shown in FIG. 6.

TABLE 1

| I/O num or name | Physical PLC |
|---|---|
| 1 | A |
| 2 | A |
| 3 | A |
| 4 | B |
| 5 | B |
| 6 | B |
| 7 | C |
| 8 | C |
| 9 | C |

Both embodiments enable the programmer to link each symbolic name used while writing the control program to a physical I/O connection 16 as well as to link each physical I/O connection 16 to a physical address on a specific PLC 1–4. Based on such linking, the configurator/editor builds a Network Configuration Table that, as described below, is used by the compiler engine when assigning portions of the control program to specific PLCs. The configurator/editor is used to map the network 12 configuration before compilation of the control program 42.

The Compiler Engine.

With reference to FIG. 4, the main purpose of the compiler engine 50 is to seamlessly transform the single control program 42 written for the control system 10 into decentralized code 46, i.e., independent code portions to be executed in specific PLCs 1–4 within the network 12.

With reference to FIG. 5, the core of the compiler engine 50 is a multi-step process that reads the control program 42, processes it, and creates the decentralized code 43 containing code portions for each PLC 1–4 in the network 12.

The compiling engine 50 performs multiple steps, each using the output of the previous step, and uses information from shared data structures. The compiler engine 50 is designed to handle source code that is written in various accepted PLC programming languages. Some are high-level programming languages, such as structured text, Basic, C, C++, or Java, while others are lower-level programming languages, such as Relay Ladder Logic, State Logic, Instruction List ("IL"), Ladder Diagram ("LD"), Function Block Diagram ("FBD"), Continuous Function Chart ("CFC") or Sequential Function Chart ("SFC"). Because of the differences in vocabulary used in high-level versus lower-level programming languages, the initial processing stage performed by the compiler engine 50 varies depending on the type of programming language that was used to write the source code.

Lexical Analysis (Scanning and Screening).

With continuing reference to FIG. 5, in Step 52, the compiler engine 50 begins compiling source code that was written in high-level languages (such as structured text, Basic, C, C++, or Java). During Step 52, the compiler engine 50 reads the control program 42 input file, detects the use of illegal symbols, and performs several additional screening tasks, such as eliminating spaces, and identifying language keywords, standard identifiers, and count line numbers. The output of Step 52 is a "tokenized" program, i.e., the program text is transformed as a sequence of "tokens," such as "constants," "identifiers," "operators," "reserved words," and "separators."

Step 52 may generally be skipped when using a graphical (GUI-based) programming environment, such as the software tool, to write the source code in a lower-level language, such as Ladder Diagram. This is because the source code is written using predefined graphical elements from a given list.

Syntax Analysis (Parsing).

At Step 54, the compiler engine reads the sequence of tokens (the "tokenized" control program 42), builds an abstract syntax tree, reports as many as possible syntax errors, and, when possible, diagnoses and corrects syntax errors. The output of Step 54 is an abstract syntax tree, which is a data structure representing the parsed program in terms of categories, such as "declarations," "statements," and "expressions."

Semantic Analysis.

At Step 56, the compiler engine 50 reads the abstract syntax tree, reports semantic errors such as undeclared variables or type mismatches, resolves the usage of variables, and adds attributes to the abstract syntax tree.

Steps 52, 54, and 56 are considered basic with respect to compiling techniques. At Steps 52, 54, and 56, the compiler engine 50 compiles the control program 42 source code as known in the art, i.e., it translates the control program 50 from source code, whether written in a high or lower level programming language, into machine code having a plurality of statements. Steps 52, 54, and 56 are required before the compiler engine 50 can decentralize the control program 42 by assigning each statement to a specific PLC in the network.

Dependency Analysis.

It will be appreciated that the compiler engine 50 of the present invention must "understand" the control program 42 before being able to assign statements corresponding to different tasks or instructions to different PLCs. A first level of such "understanding" was performed in Step 56 by resolving usage variables, defining the scope of variables, etc. At Step 58, the compiler engine 50 checks the dependency of control program 42 constants and variables in order to identify statements that may require additional "gluing" logic. Such gluing logic may be necessary for statements that reference the same constant or variable but are assigned to, and are ultimately executed in, different PLCs.

For example, in a high-level programming language:

```
IF EndOfLine
    THEN StopMotor
    |
and later:
    |
IF StopMotor
    THEN RedLight
```

Or, in a graphical programming language:

```
--------||--------------( )-------
    EndOfLine        StopMotor
    |
and later:
    |
--------||--------------( )-------
    StopMotor        RedLight
```

In this illustration, the StopMotor (output) variable referenced in one statement of the control program 42 is used by a later statement of the control program 42 to set another (output) variable, RedLight. This dependency may occur directly in a subsequent statement, or indirectly in a statement contained in a called procedure.

At Step 58, the compiler engine 50 builds a Cross Reference Dependency Table containing the number of later existing dependencies for every constant and variable set by a statement, as well as a reference to these statements. In the above example, because the variable StopMotor which represents a physical output is used later as an input, a dependency count for this variable will be set to 1, with a reference pointer to the later statement.

Initial Mapping.

At Step 60, the compiler engine 50 accesses the Network Configuration Table 72, which will be used later to assign the control program 42 statements to specific PLCs based on the configuration of the PLCs and I/O connections in the network.

At Step 60, the compiler engine also builds a Control Statement Weighting Matrix ("CSWM") to serve as the main decision table for the compiling process. At the end of the entire compiling process, each control program statement must be executed in a certain PLC on the network. With reference to FIG. 7, the CSWM holds one table per statement for each PLC in the network.

Each table holds information about the relevance, or coupling, between one statement and one PLC, based of several binding criteria. Examples of such criteria are:

Input Timing Constraints—for each input referred to in the statement, how often should the system scan the input (i.e., how fast should the system be aware of a change in each input). When this time is short, there is a stronger need for such statement to be executed in the PLC that has this input. The input timing information is defined by the user using the software application.

Output Timing Constraints—for each output referred to in the statement, how fast should the system commit the output from the moment a certain condition is met. When this time is short, there is a stronger need for such statement to be executed in the PLC that has this output. The output timing information is defined by the user using the software application.

CPU Usage—how much CPU usage does the statement require from this specific PLC.

Memory Usage—how much memory does the statement require from this specific PLC.

Communication—how much communication with other PLCs does the statement require if executed in this specific PLC.

At Step 60, the compiler engine 50 parses each statement, retrieves information about the configuration of the network from the Network Configuration Table 72 that was defined using the configurator/editor software application, and, based on the defined network configuration, builds a CSWM table for each combination of statement and PLC. In another embodiment, the process is optimized and the compiler engine 50 filters the information and builds CSWM tables only for relevant combinations of statement and PLC.

Initial Weighting.

As described in detail below, at Step 62, the compiler engine 50 determines which part of the control program 42 will be executed on each PLC and what information will be transmitted over the network to each PLC. In other words, the compiler engine 50 automatically assigns each statement of the compiled control program to at least one PLC. Thus, at Step 62, a distributed control system is created out of a single control program.

Following the creation of CSWM tables at Step 60, the compiling engine 50 performs an initial weighting process. At Step 62, the compiler engine 50 parses over the CSWM tables and makes an initial assignment of each statement to a PLC. In order to make this initial assignment, the compiler engine 50 uses a Weights Table. The Weights Table specifies the weight given to each of binding criteria in the CSWM table. One embodiment of the weights table is shown in Table 2, below.

TABLE 2

| Criteria | Weight |
| --- | --- |
| Inputs | 40% |
| Outputs | 35% |
| CPU usage | 5% |
| Memory Usage | 5% |
| Communication | 15% |

At Step 62, the compiler engine 50 multiplies each binding criteria value (determined during Step 60 for each statement and PLC combination) by the weight for each binding criteria as predefined by the Weights Table, then sums the results to form a total score for each statement and PLC combination. The compiler engine 50 then creates an initial PLC Assignment Table by assigning each statement to the PLC with the highest total score.

With reference to FIG. 6, an output 8 is shown which is physically connected to a PLC C. Because the Weights Table in the described embodiment specifies a relatively high weight of 35% to the Outputs binding criteria, if a statement of the control program referred to output 8, it is likely that the statement will be assigned to, and ultimately executed in, the PLC C.

Synchronization and Inter-PLC Communication.

Referring back to FIG. 5, at Step 64, the compiler engine 50 detects missing logical links based on the initial PLC assignment, and then refines the PLC assignment. During this stage, the compiler engine analyzes the PLC Assignment Table (created at Step 62) and the Cross Reference Dependency Table (created at Step 58), and adds "gluing" statements (or "phantom" statements) to the control program in order to mirror information required by dependent statements that were assigned to different PLCs.

In particular, based on the initial PLC assignments, the compiler engine 50 builds an I/O Transmit/Receive ("IOTXRX") Table for each PLC. The IOTXRX Table specifies all external inputs and outputs (i.e. inputs and outputs of other PLCs) which are referenced by the statements to be executed in that PLC. The IOTXRX Table also specifies the PLC that contains each referenced external input or output. One embodiment of the IOTXRX Table is shown in Table 3, below.

TABLE 3

| IO | Receive From | Transmit To |
|---|---|---|
| 1 | PLC A | |
| 2 | | PLC B |
| 3 | | PLC B |
| 4 | | |
| . | | |
| . | | |
| . | | |
| n | | |

Using the IOTXRX Table, the compiler engine 50 adds gluing statements to each PLC that has been assigned statements which reference other PLCs and to each PLC that is referenced in statements of other PLCs. The gluing statements are to be executed at the end of each scan. The gluing statements instruct the PLC to transmit messages (specifically for each other, referencing PLC or broadcasted to multiple PLCs depending on the network configuration and on the number of PLCs who needs the information) to the other, referencing PLCs notifying them of all changes in inputs. Such messages are only transmitted when the referenced input has changed and only when the referencing PLC needs to be notified of the change.

Similarly, the gluing statements instruct the PLC to transmit messages (specifically) to the other, referenced PLCs notifying them of all changes to be made in outputs. Such messages are only transmitted when the referenced output needs to be changed.

In one embodiment, each PLC has a communication interrupt handler which handles the reception of the transmitted messages that are addressed to the PLC and contain information relating to changes in inputs and outputs. This information is made available to the running control program as the changes occur.

In other embodiments, a message priority scheme is implemented in order to allow critical change information to be transmitted and handled faster. The priority of a message is based on the input or output time constraints defined by the user using the software application.

Optimization.

At Step 66, the compiler engine 50 ensures that only the required statements are executed in each PLC and that only the required information is transmitted to each PLC. In addition, the compiler engine 50 balances the workload between the PLCs as much as possible.

At Step 66, optimization is required to increase the efficiency of the control system, improve the scan time of each PLC, decrease memory requirements, and balance the processing workload between the PLCs in the network. At Step 66, the compiler engine 50 performs optimization tasks based on a further analysis of the IOTXRX Table (created at step 64), the CSWM tables (created at Step 60), the Cross Reference Dependency Table (created at Step 58), the Weights Table (accessed at Step 62) and/or the Network Configuration Table (created using the configurator/editor software application). Such optimization tasks may include, (1) combining statements or data that need to be mirrored in different PLCs in order to minimize communication; (2) moving non-critical statements from busy PLCs to less busy PLCs, provided that the score is not greatly affected, where the busyness of a PLC is determined by combining the total CPU usage and the total memory usage of all statements assigned to that PLC; (3) partially rerunning Steps 60, 62, and 64 in order to assess the changes proposed by Step 66.

In addition, the compiler engine 50 may apply other known compiler optimization schemes. These may include machine independent transformations (e.g., removal of redundant computations, removal of useless code) or machine dependent transformations (e.g., improve mapping onto machine, replace costly operations with cheaper ones, replace sequence of instructions with more powerful ones). Known optimization schemes also include such techniques as loop unrolling, factoring loop invariants, and strength reduction.

The main challenge of Steps 60, 62, 64, and 66 is the need to "understand" the application in a way that will allow automatic breakdown of the control program into separate, independent (but synchronized) statements for each PLC in the network. The compiler engine 50 algorithms handle such challenges as sharing complex variables (e.g., flags, "memory bits" and other data types) between the PLCs, handling the difference of scan time between the PLCs, and synchronizing outputs physically connected to different PLCs.

Simulation.

In one embodiment, a simulation process is performed to analyze whether the control system will provide the performance required by the control program, based on known constraints such as the network configuration (i.e., which I/O connection is connected to which PLC), the network available bandwidth, and the workload of each PLC. The simulation process is a powerful iterative debugging task, which may require the user to refine the control program or design layout. Advantageously, such a what-if simulation can be performed before the actual control system is ever built.

Code Generation.

At Step 68, the compiler engine 50 generates loadable code 46 for each PLC. Such loadable code 46 is a sequence of machine operations that are semantically equivalent to the intermediate representation of statements previously treated by the compiler engine 50. Known techniques such as instruction scheduling (reordering the produced operation stream in order to minimize pipeline stalls and exploit the available instruction level parallelism) and register allocation are used.

Intelligent Download.

Once the compiler engine 50 has generated loadable code 46, the statements of the control program are transmitted from the host computer over a data transmission medium to each PLC in the network. In accordance with the present invention, this download process does not interrupt the processing of an active PLC because the new control program is stored in a mirror memory area of each PLC.

Run Synchronization.

After the new control program has been downloaded to all of the PLCs in the network using a wired or wireless transmission media, a run synchronization process is performed to simultaneously stop all active PLCs, swap the old control program for the new control program that has been stored in the mirror memory area of each PLC, and either simultaneously start all PLCs or start the PLCs in a predefined start sequence. The run synchronization process is initiated by a signal from the host computer which instructs each PLC to stop, swap control programs and start processing.

In one embodiment, the host computer and each PLC store a record of each control program download. Such records are used to prevent unauthorized downloads and to create and maintain electronic signatures for every change in each PLC. These security features are desired for improved configuration management purposes and for regulatory requirements such as FDA, 21 C.F.R § 11.100 et seq.

Wireless Controllers.

In accordance with another embodiment of the present invention, each PLC includes embedded (built-in) short range radio communication to provide a wireless controller. The wireless controller is a self-contained device that does not require any external transceiver or RF module, or any external antenna. In other embodiments, the wireless controller may include an external antenna for increased range if required by the control system.

It will be appreciated that using wireless controllers in the network replaces expensive communication wiring, which is typically required to connect the PLCs, with a reliable wireless link. To illustrate using a non-industrial example, with reference to FIG. 2, a wireless home automation system 30 is shown wherein each of the controllers 31–37 are capable of communicating wirelessly. Thus, no wiring, cabling or other physical infrastructure is required to connect the controllers 31–37 to each other in order to allow data and signal interchange or remote programming. Moreover, the system 10 may be expanded with additional controllers without the need for more wiring.

The wireless link allows the PLCs 31–37 to share data, signals, communicate with sensors, and communicate with host computers. The use of wireless controllers also provides for ease of installation, flexibility, scalability and high reliability. The wireless link can be based on various technologies including, but not limited to, spread spectrum communication using Industrial, Scientific and Medical ("ISM") frequency bands.

The Wireless Controller Technology.

In one embodiment of the present invention, an RF module (radio frequency electronic circuitry) is integrated or embedded into each PLC, along with a built-in antenna. The RF module is integrated into the housing of the PLC and may share the same electronic printed circuit board ("PCB") as the "standard" PLC circuitry (i.e., processor, memory, and I/O circuitry). The embedded RF module uses a license-free frequency band such as an ISM band and a publicly accepted communication standard such as Bluetooth™, IEE802.11 (a/b/g), or ZigBee™.

In order to provide a better signal to noise (S/N) ratio and to reduce the probability of interference, the wireless controllers of the present invention use a spread spectrum technology based either on the "direct sequence" or "frequency hopping" techniques. With reference to FIG. 8, in a frequency hopping system, the carrier frequency "hops" from frequency to frequency over a wide band according to a unique sequence. Frequency hopping allows for the coexistence of multiple stations in the network, statistically lowers the probability for interference, and increases network security.

A wireless controller of the present invention uses a built-in integrated antenna, such as a printed circuit board antenna or an embedded planar inverted-f (type) antenna ("PIFA"). These are omni-directional antennas which allow the PLCs to communicate with each other in any direction, albeit at a reduced range. In other embodiments, an external antenna can be connected to the wireless controller, such as a higher gain antenna (e.g., a directional antenna), to achieve a higher distance range.

In the described embodiment, the topology of the wireless network can be star or mesh. A star network features a central connection point called a "hub" or "access point," and generally requires more cable than a mesh network. However, a failure in a star network cable will only take down the network access of one PLC rather than take down the entire network of PLCs. Mesh topologies involve the concept of routes. Unlike the star topology, messages sent on a mesh network can take any of several possible paths from source to destination. Some WANs, like the Internet, employ mesh routing.

The integration of the embedded RF module in a PLC requires "environment awareness," especially in a mesh system. This means that the wireless controller has, in addition to its normal PLC activity, the need to "know" its neighbors and to "understand" the network. Thus, in one embodiment of the present invention, the wireless controllers are provided in a mesh network topology with message relaying and self-organizing capabilities as described by Poor, U.S. Pat. No. 6,028,857, assigned to Massachusetts Institute of Technology, which is incorporated herein by reference. In this embodiment, a wireless controller can send and receive messages, as well as function as a router to relay messages for its neighbors. Through this relaying process, a packet of wireless data will find its way from an originating wireless controller to a destination wireless controller, passing through intermediate wireless controllers. Such relaying functionality adds reliability and redundancy to the control system.

Specifically, an ad-hoc "contour" routing algorithm is used which allows a message to reach its destination wireless controller, even when the network configuration is incompletely described or rapidly changing. The wireless controllers maintain cost tables that indicate the "costs" of transmitting a message to other nodes in the network.

With reference to FIG. 9, wireless controller A is shown as being separated from wireless controller B by several intermediate wireless controllers. Suppose that wireless controller A is to send a message to wireless controller B and that wireless controller A cannot reach wireless controller B directly. In accordance with the present invention, wireless controller A has stored information in its cost table from previously received messages that wireless controller B is four hops away. Wireless controller A sends the message to all its neighbors, the message being encapsulated in a network level frame that says, in effect, "forward this message to wireless controller B if you can do so in fewer than four hops."

All of wireless controller A's immediate neighbors receive the message, because the RF transmissions are omni-directional, but only those wireless controller that are "closer" to wireless controller B will be able to deliver the message in three hops or fewer. Those wireless controllers that are "farther away" would require five hops, for example. Thus, those neighbors that are "on the way" to wireless controller B relay the message. The process continues until the message reaches wireless controller B.

With this process, the intermediate wireless controllers between wireless controller A and wireless controller B keep track of the return path to wireless controller A. When originating wireless controller A transmits the message, each of its neighbors makes an entry in a cost table to the effect that wireless controller A is one hop away. The cost tables in the second tier of intermediate wireless controllers are updated with entries to note that wireless controller A is two hops away. This process continues, so that by the time the message arrives at its destination wireless controller, wireless controller B and all the intermediate wireless controllers have retained entries in the cost tables indicating the number of hops to send a message to wireless controller A.

In addition, the wireless controllers are self-configured and self-organized without the need for a system administrator. As stated above, each of the wireless controllers maintains a cost table of the number of hops to each of the other wireless controllers in the control system. However, this information is not available when the network is installed and it is also unavailable when wireless controllers are added to the network or physically moved to new locations.

Accordingly, a vertigo procedure is used when the originating wireless controller A does not include in its cost table the number of hops to the destination wireless controller B. Specifically, the originating wireless controller A sends a flood message. This message is relayed once by every wireless controller in the network and therefore is guaranteed to eventually find its way to the destination wireless controller B. The destination wireless controller B will usually receive replicas of the message over multiple paths. Each replica includes in its frame the number of hops it has traversed since leaving the originating wireless controller A.

Consequently, the destination wireless controller B can return a message to the originating wireless controller A specifying, as the number of hops, the smallest number that was associated with one of the received replicas of the flood message. In the same manner, each of the intermediate wireless controllers through which the flood message passed on the way to the destination wireless controller B now has information concerning the shortest number of hops to the originating wireless controller A and can make the appropriate entry in its cost table.

If wireless controller B has physically moved so that the cost tables in other wireless controllers are no longer valid, the need to update the cost tables will be ascertained when another wireless controller, such as wireless controller A, attempts to send a message to wireless controller B. The number of hops specified in the message may be exhausted before the message reaches the destination wireless controller B. The message may therefore not reach the destination wireless controller B and the originating wireless controller A will then not receive an acknowledgement of receipt of the message. The originating wireless controller A can then employ the flood algorithm to update the cost tables.

Accordingly, the mesh network of the present invention is redundant, allowing automatic rerouting of messages should one wireless controller fail or change locations in the network. The mesh network is also scalable to hundreds or even thousands of wireless controllers. Thus, adaptability and scalability are important characteristics of the control system.

It is known that PLCs perform standard activities that include reading ("scanning") all inputs, performing logical functions (the control program itself), and writing to the relevant outputs. These tasks are repeated endlessly and each execution takes a "scan time" (usually milliseconds). In an embodiment of the present invention, the scan time of a PLC is not affected by the wireless functionality added to the PLC. This can be achieved by using an additional independent processor or other electrical components for controlling the wireless link, by using PLC idle times and advanced interrupt management for wireless link related tasks, or by any combination of these techniques.

The coexistence of controller (PLC) circuitry, RF circuitry, and a controlled environment (industrial, medical, or other) requires a combination of low radiated interference (RFI/EMI) from one side and a high level of immunity against such interference from the other side (although RF transmission and reception is a basic requirement of the control system). A wireless controller of the present invention complies with these requirements using solutions such as on board electronic filters, shielding materials, software-aware switched transmission, and/or other techniques.

Web Access Control Platform.

Figure 10:
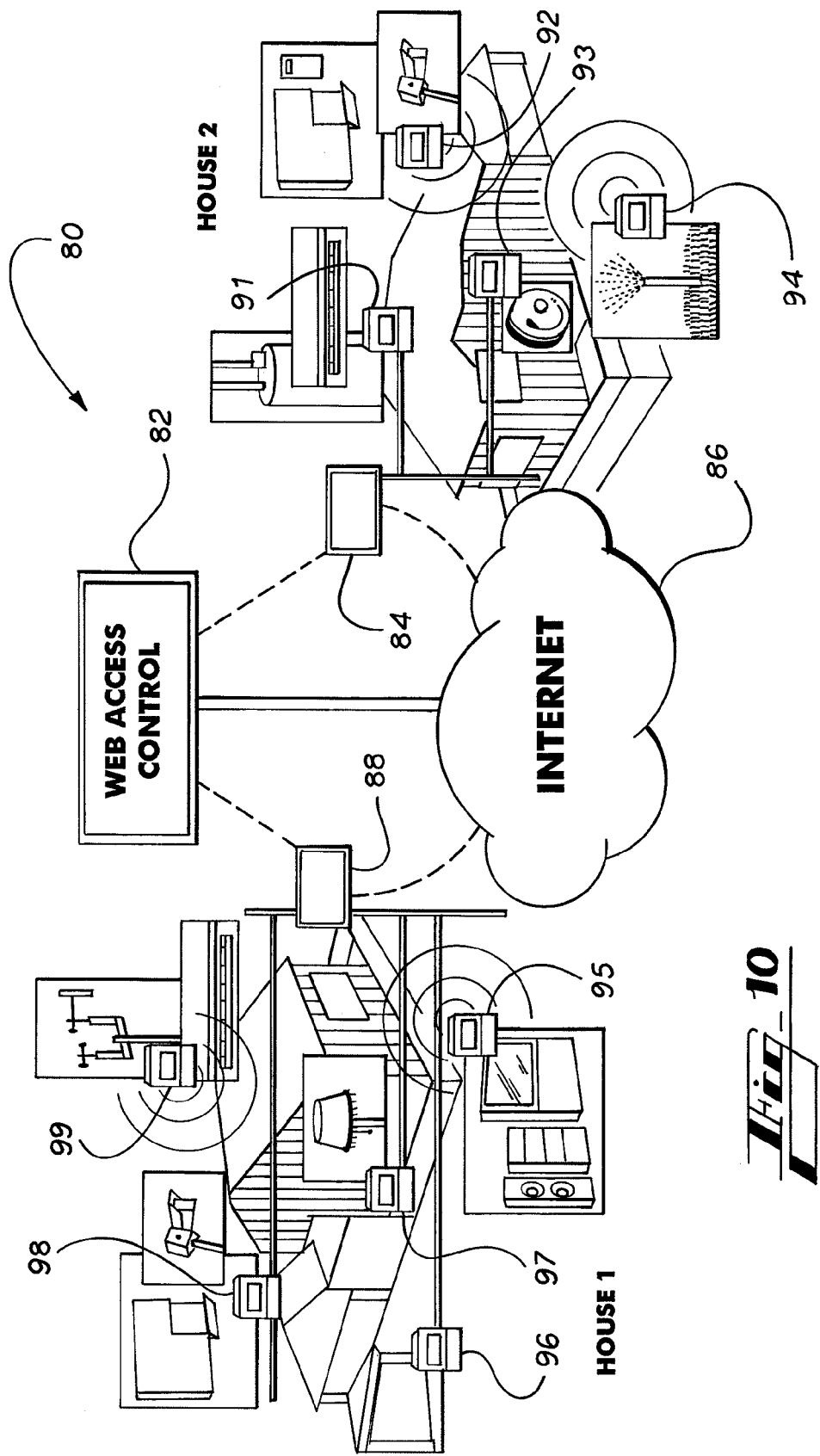
FIG. 10 is a relational diagram of a web access control platform in accordance with the present invention.

With reference to FIG. 10, in other embodiments, the present invention also comprises a web access control platform 80 which provides an Internet-based communication platform for automation and control applications. The web access control platform 80 functions similarly to instant messaging services (such as those provided by AOL, Microsoft, ICQ, and Yahoo), however, the web access control platform of the present invention is designed to be used by a plurality of control elements 84, 88, and 91–99 to "chat" with each other (e.g., exchange data, signals, programs, synchronization messages) over the Internet 86 or other wide area network ("WAN"). Thus, in order to use the web access control platform 80, the control element 84, 88, and 91–99 (such as a PC 84 and 88 or a PLC 91–99) must be connected to the Internet 86 (using either a wired or wireless connection).

With reference to FIG. 2, in the previously described non-industrial home automation example, other dimensions are be added to the automation system 30 of the described embodiment by connecting the system 30 to the "external world" outside the house. This allows the system 30 to (1) send "intrusion detection" or "emergency button pressed" signals from the security controller 35 to a neighborhood consolidating system; (2) get the time of day from an external source in order to synchronize all controllers 31–37; (3) allow easy web access from any Internet browser to configure or remotely control various controllers 31–37; and (4) allow easy access from a cellular phone (via Short Message Service ("SMS") or other wireless applications) to control elements such as instructing the air condition and climate controller 36 to turn on the heating or air-conditioning when leaving the office or instructing the lighting controller 37 to turn on the driveway lights when approaching the home.

Returning to FIG. 10, in order to communicate, control elements 84, 88, and 91–99 coordinate their initial direct communication through a web access control server 82 that provides the coordination service. In addition to the coordination service, the web access control server 82 can provide additional optional services such as easy Web interface to control elements 84, 88, and 91–99, automatic message rerouting to other services (emails, cellular SMS messages, etc.), and control program implementation.

Web Access Control Client.

A web access control client is a software core that resides in the control elements 84, 88, and 91–99 of the present invention. A web access control client can be added or loaded into PLCs 91–99 (or may be included as a built-in support within the PLC operating system) and may be installed on PC 84 and 88 systems wishing to become control elements 84, 88, or 91–99 in a designed system.

A natural prerequisite for all control elements 84, 88, and 91–99 (PLCs and PCs) is to provide Internet 86 connectivity, using namely, existing TCP/IP protocol support, Ethernet LAN support and connecting the LAN to the Internet 86 (usually through routers, firewalls, and other network management devices), using dialup connectivity through dialing modems, or using Wireless internet access (such as "Wi-Fi" access). These prerequisites are easily fulfilled today by all PC 84 and 88 systems and by a growing number of PLCs 91–99 with built-in Ethernet and TCP/IP support.

Web Access Control Servers.

The primary goal of the web access control server 82 is to provide network presence awareness and coordination services for web access control clients. The web access control server 82 can be considered a "rendezvous" corner, i.e., a meeting point service for the control system. Whenever an active control element 84, 88, or 91–99 (PC or PLC) running the web access control client comes online (connects to the Internet 86), the web access control client reports its presence to the predefined, known web access control server 82 (either public or private, as described further below).

With continuing reference to FIG. 10, any online control element, for example, 92 (an initiator) that needs to communicate with another online control element, for example, 96 (a responder) asks the web access control server 82 for a unique handle, based, in one embodiment, on a one time password ("OTP") algorithm, that contains information that will allow this connection. Following a positive identification of the initiator 92, based on an authentication scheme, and following authorization and security rules defined by the responder 96, the handle is granted to the initiator 92. The initiator 92 (provided with a valid handle) can then communicate directly (peer-to-peer) with the responder 96 and maintain an open link for exchanging data, signals, programs, etc.

The web access control server 82 may be either public or private. In one embodiment, a public web access control server 82 is established and maintained by a third party for public use in order to provide web access control services. The use of the public web access control server 82 requires registration. In another embodiment, a private web access control server 82 is established and maintained by the end user.

Web Access Control Web Based Administration.

In order to use the web access control server 82, a web access control client must be registered in the server 82 and have a unique ID. In the described embodiment, registration is performed through a web-based interface of the server 82. This interface allows for the administration (registration/removal) of web access control clients, administration of client profiles, administration of authorization and security schemes (i.e., which client is entitled to communicate with which other client), and administration of add-on services provided by the server 82. In order to use the interface, the user must be registered and authenticated.

Web Access Control Add-On Services.

Because all communications are initiated through the web access control server 82, the server 82 is able to provide add-on services to its clients. Such services may include:

Easy Web Access—a remote control and monitoring web-based application that can be easily created using a web-based or PC-based editor. Such an application creates a private web page for the application, including textual and graphical elements linked to real events and signals of web access control clients (e.g., inputs and outputs of a PLC).

Heart Beat Monitoring—an application that can monitor control elements 84, 88, and 91–99 either actively (sending heart beat check requests in predetermined intervals) or passively (waiting to get heart beat messages in predetermined intervals). A failed heart beat check can trigger a message to another control element 84, 88, and 91–99 or trigger any other operation defined by the user.

Statistics—rules that are based on message statistics can trigger operations defined by the user according to the rate or number of communications. Reports can be made available for monitoring or accounting purposes.

Message Center—the server can act as a centralized message center that consolidates messages from control elements 84, 88, and 91–99 and performs actions such as triggering emails, cellular SMS messages or other messages to control elements 84, 88, and 91–99, based on predetermined rules.

Remote Mass Downloading—the server can be used to manage a scheduled sequence of control applications, or even operating system downloads, and updates to all control elements.

Programming with the Web Access Control Platform.

In accordance with the present invention, web access control clients are able to communicate with each other over the Internet 86 after initiating the communication through the web access control server 82. One type of communication provided by the present invention is seamless inter-PLC 91–99 communication. A PLC, for example, 91 can access I/O signals and other data types (memory bits, flags, variables etc.) of other PLCs 92–99 seamlessly in the control system. This enables the distributed control system to expand over the Internet 86. The seamless programming requires that the control system and control elements 84, 88, and 91–99 have built-in support to this feature. Combined with the distributed/centralized model, a centralized control system can be designed and implemented based on numerous smaller systems that reside in different geographical locations.

Another type of communication provided by the present invention is instant messaging between control elements 84, 88, and 91–99. Any web access control client can send a limited length immediate message to any other client (based on the authorization policy applied). The receiving web access control client can read this message, acknowledge, reject, and react upon it. The message can be sent either directly from one control element, for example, 91 to another control element, for example, 94, or indirectly through the web access control server 82 (for relaying purposes in case of a temporary downtime of one element). The sending client is always notified whether the message reached its destination.

Other applications require specific programming to be implemented in the control element 84, 88, and 91–99. The web access control client provides an open and documented set of Application Programming Interfaces ("APIs") that enable developers to develop their own applications (both within PLC and PC control elements 84, 88, and 91–99) while all communication is initiated, handled, and transferred over the Internet 86 by the web access control platform 80.

Having thus described the invention in detail, it should be apparent that various modifications and changes may be made without departing from the spirit and scope of the present invention. Consequently, these and other modifications are contemplated to be within the spirit and scope of the following claims.

I claim:

1. A method for implementing a control program in a network of programmable logic controllers having input/output connections, comprising the steps of:

a. translating the control program from a source code into a machine code having a plurality of statements;
b. defining the configuration of the programmable logic controllers and the input/output connections in the network;
c. automatically assigning each statement of the machine code to at least one programmable logic controller based on the defined network configuration;
d. transmitting each statement over a data transmission medium to the programmable logic controller assigned to the statement;
e. for each constant and variable set by the statements of the machine code, determining the number of statements which reference the previously set constant or variable; and
f. storing the number of referencing statements and a pointer to each referencing statement.

2. A method as defined in claim 1, further comprising the step of:
a. reassigning at least one of the statements to a different programmable logic controller based on the number of referencing statements.

3. A method for implementing a control program in a network of programmable logic controllers having input/output connections, comprising the steps of:
a. translating the control program from a source code into a machine code having a plurality of statements;
b. defining the configuration of the programmable logic controllers and the input/output connections in the network;
c. automatically assigning each statement of the machine code to at least one programmable logic controller based on the defined network configuration;
d. transmitting each statement over a data transmission medium to the programmable logic controller assigned to the statement;
e. identifying at least one external input/output connection referenced by the statements assigned to a first programmable logic controller;
f. identifying a second programmable logic controller having the at least one referenced external input/output connection;
g. adding at least one gluing statement to the control program for notifying the first programmable logic controller of a change at the referenced external input/output connection; and
h. assigning the at least one gluing statement to the second programmable logic controller.

4. A method as defined in claim 3, further comprising the step of:
a. transmitting a message over the data transmission medium from the second programmable logic controller to the first programmable logic controller notifying the first programmable logic controller of a change at the referenced external input/output connection.

5. A method as defined in claim 4, wherein the message is transmitted only if the first programmable logic controller needs to be notified of the change at the referenced external input/output connection.

6. A method for implementing a control program in a network of programmable logic controllers having input/output connections, comprising the steps of:
a. translating the control program from a source code into a machine code having a plurality of statements;
b. defining the configuration of the programmable logic controllers and the input/output connections in the network;
c. automatically assigning each statement of the machine code to at least one programmable logic controller based on the defined network configuration;
d. transmitting each statement over a data transmission medium to the programmable logic controller assigned to the statement;
e. identifying at least one external input/output connection referenced by the statements assigned to a first programmable logic controller;
f. identifying a second programmable logic controller having the at least one referenced external input/output connection;
g. adding at least one gluing statement to the control program for instructing the second programmable logic controller to make a change at the referenced external input/output connection; and
h. assigning the at least one gluing statement to the first programmable logic controller.

7. A method as defined in claim 6, further comprising the step of:
a. transmitting a message over the data transmission medium from the first programmable logic controller to the second programmable logic controller instructing the second programmable logic controller to make a change at the referenced external input/output connection.

8. A method as defined in claim 7, wherein the message is transmitted only if the second programmable logic controller needs to be instructed to make the change at the referenced external input/output connection.

9. A method for implementing a control program in a network of programmable logic controllers having input/output connections, comprising the steps of:
a. translating the control program from a source code into a machine code having a plurality of statements;
b. defining the configuration of the programmable logic controllers and the input/output connections in the network;
c. automatically assigning each statement of the machine code to at least one programmable logic controller based on the defined network configuration; and
d. transmitting each statement over a data transmission medium to the programmable logic controller assigned to the statement;
wherein automatically assigning each statement of the machine code to a specific programmable logic controller based on the defined network configuration includes:
a. for each statement, determining the value of more than one binding criteria for each programmable logic controller;
b. for each statement, computing a score for each programmable logic controller, wherein the score is a function of the value of each of the more than one binding criteria and a weight of each of the more than one binding criteria; and
c. assigning each statement to at least one programmable logic controller based on the computed scores.

10. A method as defined in claim 9, wherein the more than one binding criteria is selected from the group consisting of input timing constraints, output timing constraints, CPU usage, memory usage, and communication.

11. A method for implementing a control program in a network of programmable logic controllers having input/output connections, comprising the steps of:
a. translating the control program from a source code into a machine code having a plurality of statements;

b. defining the configuration of the programmable logic controllers and the input/output connections in the network;
c. automatically assigning each statement of the machine code to at least one programmable logic controller based on the defined network configuration;
d. transmitting each statement over a data transmission medium to the programmable logic controller assigned to the statement;
e. storing the statements in a mirror memory area of each of the programmable logic controllers;
f. instructing each of the programmable logic controllers to stop processing a plurality of old statements stored in a memory area;
g. instructing each of the programmable logic controllers to swap the plurality of old statements stored in the memory area for the statements stored in the mirror memory area; and
h. instructing each of the programmable logic controllers to process the statements.

12. A method for implementing a control program in a network of programmable logic controllers having input/output connections, comprising the steps of:
a. translating the control program from a source code into a machine code having a plurality of statements;
b. defining the configuration of the programmable logic controllers and the input/output connections in the network;
c. automatically assigning each statement of the machine code to at least one programmable logic controller based on the defined network configuration;
d. transmitting each statement over a data transmission medium to the programmable logic controller assigned to the statement, wherein the data transmission medium includes electromagnetic waves, the network has a mesh topology, and a radio frequency module and an antenna are embedded in each of the programmable logic controllers;
e. relaying a message from an originating programmable logic controller to a destination programmable logic controller using at least one intermediate programmable logic controller; and
f. tracking in a cost table, in each of the originating programmable logic controllers, the number of intermediate programmable logic controllers between the originating programmable logic controller and the destination programmable logic controller.

13. A method for implementing a control program in a network of programmable logic controllers having input/output connections, comprising the steps of:
a. translating the control program from a source code into a machine code having a plurality of statements;
b. defining the configuration of the programmable logic controllers and the input/output connections in the network;
c. automatically assigning each statement of the machine code to at least one programmable logic controller based on the defined network configuration;
d. transmitting each statement over a data transmission medium to the programmable logic controller assigned to the statement, wherein the data transmission medium includes electromagnetic waves, the network has a mesh topology, and a radio frequency module and an antenna are embedded in each of the programmable logic controllers;
e. relaying a message from an originating programmable logic controller to a destination programmable logic controller using at least one intermediate programmable logic controller;
f. tracking in a cost table, in each of the originating programmable logic controllers, the number of intermediate programmable logic controllers between the originating progran-imable logic controller and the destination programmable logic controller;
g. relaying a flood message from the originating programmable logic controller to the destination programmable logic controller using at least one intermediate programmable logic controller;
h. determining the least number of intermediate programmable logic controllers required to relay the flood message;
i. relaying a message comprising the least number of intermediate programmable logic controllers required to relay the flood message, from the destination programmable logic controller to the originating programmable logic controller; and
j. updating the cost table of the originating programmable logic controller.

14. A method for implementing a control program in a network of programmable logic controllers having input/output connections, comprising the steps of:
a. translating the control program from a source code into a machine code having a plurality of statements;
b. defining the configuration of the programmable logic controllers and the input/output connections in the network;
c. automatically assigning each statement of the machine code to at least one programmable logic controller based on the defined network configuration;
d. transmitting each statement over a data transmission medium to the programmable logic controller assigned to the statement;
e. establishing a connection between a first web access control client in a first control element and a wide area network;
f. requesting a handle for a second web access control client in a second control element from a web access control server in the wide area network;
g. transmitting the handle from the web access control server to the first web access control client; and
h. transmitting a message from the first control element to the second control element over the data transmission medium wherein the message is not relayed through the web access control server.

15. A method as defined in claim 14, wherein the data transmission medium is selected from the group consisting of direct connection, flat cable, plug-in type rack-connection, plug-in type motherboard-connection, fiber-optic cable, twisted-wire pair, and coaxial cable.

16. A method as defined in claim 14, wherein the data transmission medium includes electromagnetic waves.

17. A method as defined in claim 14, wherein the web access control server is a public server.

18. A method as defined in claim 14, wherein the web access control server is a private server.

19. A system for implementing a control program in a network of programmable logic controllers having input/output connections comprising:
a. a software application for defining the configuration of the programmable logic controllers and the input/output connections in the network;

b. a compiler engine for translating the control program from a source code into a machine code having a plurality of statements and for automatically assigning each statement of the machine code to at least one programmable logic controller based on the defined network configuration; and c. a host computer for transmitting each statement over a data transmission medium to the programmable logic controller assigned to the statement;

wherein the compiler engine:

a. for each constant and variable set by the statements of the machine code, determines the number of statements which reference the previously set constant or variable; and b. stores the number of referencing statements and a pointer to each referencing statement.

20. A system as defined in claim 19, wherein the compiler engine:

a. reassigns at least one of the statements to a different programmable logic controller based on the number of referencing statements.

21. A system for implementing a control program in a network of programmable logic controllers having input/output connections comprising:

a. a software application for defining the configuration of the programmable logic controllers and the input/output connections in the network;

b. a compiler engine for translating the control program from a source code into a machine code having a plurality of statements and for automatically assigning each statement of the machine code to at least one programmable logic controller based on the defined network configuration; and c. a host computer for transmitting each statement over a data transmission medium to the programmable logic controller assigned to the statement;

wherein the compiler engine:

a. identifies at least one external input/output connection referenced by the statements assigned to a first programmable logic controller;

b. identifies a second programmable logic controller having the at least one referenced external input/output connection;

c. adds at least one gluing statement to the control program for notifying the first programmable logic controller of a change at the referenced external input/output connection; and d. assigns the at least one gluing statement to the second programmable logic controller.

22. A system as defined in claim 21, wherein the second programmable logic controller is configured to transmit a message over the data transmission medium to the first programmable logic controller notifying the first programmable logic controller of a change at the referenced external input/output connection.

23. A system as defined in claim 22, wherein the second programmable logic controller is configured to transmit the message only if the first programmable logic controller needs to be notified of the change at the referenced external input/output connection.

24. A system for implementing a control program in a network of programmable logic controllers having input/output connections comprising:

a. a software application for defining the configuration of the programmable logic controllers and the input/output connections in the network;

b. a compiler engine for translating the control program from a source code into a machine code having a plurality of statements and for automatically assigning each statement of the machine code to at least one programmable logic controller based on the defined network configuration; and c. a host computer for transmitting each statement over a data transmission medium to the programmable logic controller assigned to the statement;

wherein the compiler engine:

a. identifies at least one external input/output connection referenced by the statements assigned to a first programmable logic controller;

b. identifies a second programmable logic controller having the at least one referenced external input/output connection;

c. adds at least one gluing statement to the control program for instructing the second programmable logic controller to make a change at the referenced external input/output connection; and d. assigns the at least one gluing statement to the first programmable logic controller.

25. A system as defined in claim 24, wherein the first programmable logic controller is configured to transmit a message over the data transmission medium to the second programmable logic controller instructing the second programmable logic controller to make a change at the referenced external input/output connection.

26. A system as defined in claim 25, wherein the first programmable logic controller is configured to transmit the message only if the second programmable logic controller needs to be instructed to make the change at the referenced external input/output connection.

27. A system for implementing a control program in a network of programmable logic controllers having input/output connections comprising:

a. a software application for defining the configuration of the programmable logic controllers and the input/output connections in the network;

b. a compiler engine for translating the control program from a source code into a machine code having a plurality of statements and for automatically assigning each statement of the machine code to at least one programmable logic controller based on the defined network configuration; and c. a host computer for transmitting each statement over a data transmission medium to the programmable logic controller assigned to the statement;

wherein the compiler engine:

a. for each statement, determines the value of more than one binding criteria for each programmable logic controller;

b. for each statement, computes a score for each programmable logic controller, wherein the score is a function of the value of each of the more than one binding criteria and a weight of each of the more than one binding criteria; and c. assigns each statement to at least one programmable logic controller based on the computed scores.

28. A system as defined in claim 27, wherein the more than one binding criteria is selected from the group consisting of input timing constraints, output timing constraints, CPU usage, memory usage, and communication.

29. A system for implementing a control program in a network of programmable logic controllers having input/output connections comprising:

a. a software application for defining the configuration of the programmable logic controllers and the input/output connections in the network;
b. a compiler engine for translating the control program from a source code into a machine code having a plurality of statements and for automatically assigning each statement of the machine code to at least one programmable logic controller based on the defined network configuration; and
c. a host computer for transmitting each statement over a data transmission medium to the programmable logic controller assigned to the statement;

wherein:
a. each of the programmable logic controllers stores the statements in a mirror memory area; and
b. the host computer is configured to instruct each of the programmable logic controllers to stop processing a plurality of old statements stored in a memory area, to swap the plurality of old statements stored in the memory area for the statements stored in the mirror memory area, and to process the statements.

30. A system for implementing a control program in a network of programmable logic controllers having input/output connections comprising:
a. a software application for defining the configuration of the programmable logic controllers and the input/output connections in the network;
b. a compiler engine for translating the control program from a source code into a machine code having a plurality of statements and for automatically assigning each statement of the machine code to at least one programmable logic controller based on the defined network configuration;
c. a host computer for transmitting each statement over a data transmission medium to the programmable logic controller assigned to the statement; and
d. at least one intermediate programmable logic controller for relaying a message from an originating programmable logic controller to a destination programmable logic controller;

wherein the data transmission medium includes electromagnetic waves;
wherein a radio frequency module and an antenna are embedded in each of the programmable logic controllers;
wherein the network has a mesh topology; and
wherein each of the originating programmable logic controllers is configured to track in a cost table the number of intermediate programmable logic controllers between the originating programmable logic controller and the destination programmable logic controller.

31. A system for implementing a control program in a network of programmable logic controllers having input/output connections comprising:
a. a software application for defining the configuration of the programmable logic controllers and the input/output connections in the network;
b. a compiler engine for translating the control program from a source code into a machine code having a plurality of statements and for automatically assigning each statement of the machine code to at least one programmable logic controller based on the defined network configuration; and
c. a host computer for transmitting each statement over a data transmission medium to the programmable logic controller assigned to the statement;

wherein:
a. the data transmission medium includes electromagnetic waves;
b. a radio frequency module and an antenna are embedded in each of the programmable logic controllers;
c. the network has a mesh topology;
d. each of the originating programmable logic controllers is configured to track in a cost table the number of intermediate programmable logic controllers between the originating programmable logic controller and the destination programmable logic controller;
e. the at least one intermediate programmable logic controller is configured to relay a flood message from the originating programmable logic controller to the destination programmable logic controller;
f. the destination programmable logic controller is configured to determine the least number of intermediate programmable logic controllers required to relay the flood message and is configured to transmit a message to the originating programmable logic controller comprising the least number of intermediate programmable logic controllers required to relay the flood message; and
g. the originating programmable logic controller is configured to update the cost table.

32. A system for implementing a control program in a network of programmable logic controllers having input/output connections comprising:
a. a software application for defining the configuration of the programmable logic controllers and the input/output connections in the network;
b. a compiler engine for translating the control program from a source code into a machine code having a plurality of statements and for automatically assigning each statement of the machine code to at least one programmable logic controller based on the defined network configuration; and
c. a host computer for transmitting each statement over a data transmission medium to the programmable logic controller assigned to the statement; and
d. a first web access control client in a first control element for:
　i. establishing a connection with a wide area network;
　ii. requesting a handle for a second web access control client in a second control element from a web access control server in the wide area network;
　iii. receiving the handle from the web access control server; and
　iv. transmitting a message to the second control element over the transmission medium wherein the message is not relayed through the web access control server.

33. A system as defined in claim 32, wherein the data transmission medium is selected from the group consisting of direct connection, flat cable, plug-in type rack-connection, plug-in type motherboard-connection, fiber-optic cable, twisted-wire pair, and coaxial cable.

34. A system as defined in claim 32, wherein the data transmission medium includes electromagnetic waves.

35. A system as defined in claim 32, wherein the web access control server is a public server.

36. A system as defined in claim 32, wherein the web access control server is a private server.

* * * * *